United States Patent [19]

Osada et al.

[11] Patent Number: 4,851,758
[45] Date of Patent: Jul. 25, 1989

[54] BRUSHLESS GENERATOR

[75] Inventors: Masahiro Osada; Toshihiko Tanuma; Takashi Yoshida; Hiroshi Kobiyama, all of Gunma, Japan

[73] Assignee: Sawafuji Electric Co., Ltd., Japan

[21] Appl. No.: 163,768

[22] Filed: Mar. 3, 1988

[30] Foreign Application Priority Data

Mar. 9, 1987 [JP] Japan .................................. 62-55395
Jul. 29, 1987 [JP] Japan .................................. 62-18968

[51] Int. Cl.[4] .............................................. H02P 9/10
[52] U.S. Cl. .................................. 322/63; 310/40 MM; 310/68 R; 310/184
[58] Field of Search ................. 322/46, 63, 64, 65, 322/66; 310/40 MM, 68 R, 165, 180, 184, 254, 269

[56] References Cited

U.S. PATENT DOCUMENTS

| | | | |
|---|---|---|---|
| 3,908,161 | 9/1975 | Messenger | 322/59 |
| 4,121,148 | 10/1978 | Platzer | 322/59 |
| 4,219,739 | 8/1980 | Greenwell | 310/113 |
| 4,751,415 | 6/1988 | Kitamori et al. | 310/68 R |

Primary Examiner—Patrick R. Salce
Assistant Examiner—Anita M. Ault
Attorney, Agent, or Firm—McGlew & Tuttle

[57] ABSTRACT

A brushless generator having a rotor for generating a magnetic field, a stator having magnetic poles facing the rotor a main generating winding; and a voltage is induced as the magnetic field generated in the rotor intersects the main generating winding, in which slots are provided at the locations of the stator magnetic poles facing the rotor, exciting windings are wound on the slots to generate in the exciting windings voltages having different phases with respect to that of the voltage generated in the main generating winding, and brushes are eliminated by using the voltages generated in the exciting windings.

20 Claims, 7 Drawing Sheets

(2-POLES)

FIG. 4B

(2-POLES)

FIG. 5A

(6-POLES)

FIG. 5B (6-POLES)

FIG. 5C (6-POLES)

BRUSHLESS GENERATOR

BACKGROUND OF THE INVENTION

1. Field of the Invention

This invention relates generally to a brushless generator, and more particularly to a brushless generator of a self-excited synchronous type; the brushless generator being a small-sized generator of a rotating-field type having a stator with the stator magnetic poles thereof integrally formed with yokes, in which slots are provided on the stator magnetic poles, and exciting windings are wound on the slots to generate voltages having different phases with that produced in the main generating winding to eliminate brushes, and electric power is generated by selecting the number of poles of the main generating winding wound on the stator and the number of poles of the exciting windings, selecting the construction of the rotor, and by forming a return path in the exciting winding.

2. Description of the Prior Art

Figure 15:
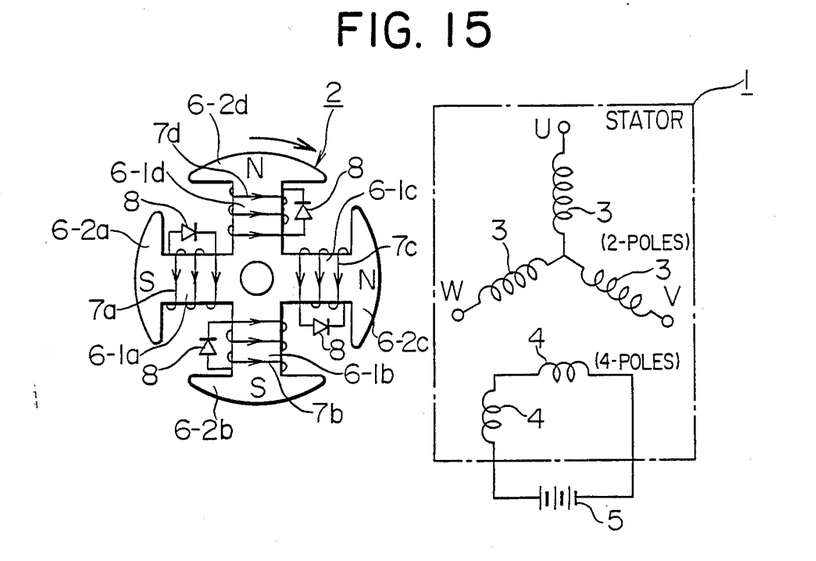
FIGS. 15 and 16 are diagrams illustrating the construction of a small-sized generator of a conventional type.

A generator of a type in which the alternating voltage induced in a field winding is rectified by a diode to use as a field current for the field winding is heretofore known as a brushless single-phase generator having a simple construction and excellent characteristics. A brushless 2-pole, 3-phase generator as shown in FIG. 15 has also been developed based on the basic principle of the abovementioned type of generator. In FIG. 15, reference numeral 1 refers to a stator; 2 to a rotor; 3 to a 2-pole, 3-phase main generating winding; 4 to a single-phase, 4-pole exciting winding; 5 to a d-c power source; 6-1a through 6-1d to field cores; 6-2a through 6-2d to salient poles; 7a through 7d to field windings; and 8 to a diode, respectively.

In the example shown in FIG. 15, the field windings 7a through 7d are wound on the field cores 6-1a through 6-1d of a 4-pole construction provided on the rotor 2. The diode 8 is connected to each of the field windings 7a through 7d so that the field cores 6-1a through 6-1d are magnetized as magnetic fields of S, S, N and N are sequentially generated in the salient poles 6-2a through 6-2d. That is, when the rotor 2 rotates in the embodiment shown in FIG. 15, the static magnetic field of the exciting windings 4 causes a field current to flow in the direction shown by arrows in the figure in the field windings 7a through 7d to magnetize the field cores 6-1a through 6-1d. This produces an apparently 2-pole magnetic field, thus yielding a 3-phase alternating output on the 2-pole, 3-phase main generating winding 3.

Figure 16:
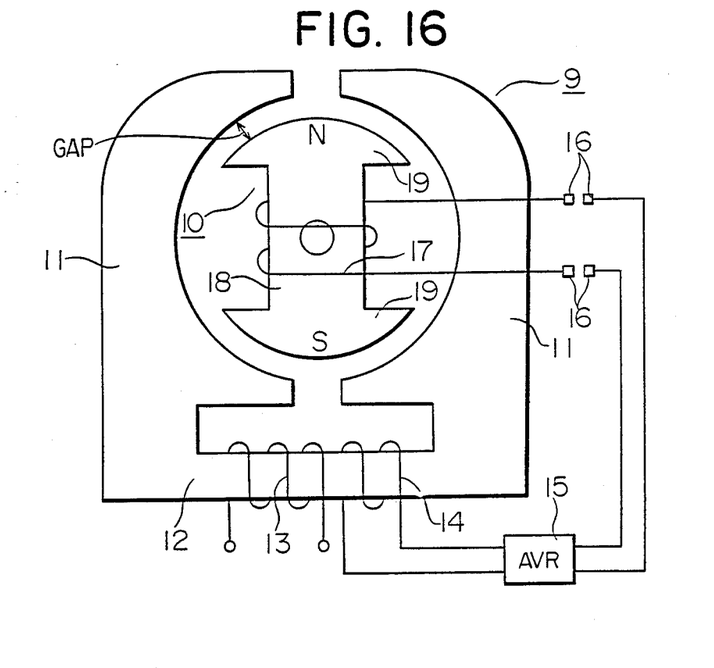

On the other hand, a generator of a self-excited, rotating-field type (concentrated winding type), as shown in FIG. 16, is heretofore known as a synchronous generator. This type of generator has been widely used because of its simple construction. In FIG. 16, numeral 9 refers to a stator; 10 to a rotor; 11 to a stator magnetic pole; 12 to a yoke; 13 to a main generating winding; 14 to an exciting winding; 15 to an automatic voltage regulator (AVR); 16 to a brush slip ring; 17 to a field winding; 18 to a rotor core; and 19 to a salient pole, respectively.

In the example shown in FIG. 16, as the rotor is rotated, a voltage proportional to the intensity of the magnetic field intersecting the exciting winding 14 is induced. Along with this, a current is supplied to the field winding 17 via the AVR 15 to magnetize the rotor core 18, producing an alternating output in the 2-pole main generating winding 13.

In the example shown in FIG. 16, it is difficult to eliminate the brush slip ring 16 because of the need to supply the current generated in the exciting winding 14 on the stator to the field winding 17 wound on the rotor.

In addition, the brushless generator of the conventional type shown in FIG. 15 is constructed so that an exciting current for the exciting windings 4 is supplied by the external d-c power source 5. This entails the need for an external d-c power source.

When used with a single-phase load, this type of generator, which has a low load compensation, tends to involve an increase in voltage drop when the load current is increased.

SUMMARY OF THE INVENTION

It is an object of this invention to provide a self-excited brushless generator that requires no external d-c power source.

It is another object of this invention to provide a rotor and stator having excellent voltage regulation even when used with a single-phase load.

It is a further object of this invention to provide a stator having slots on the stator magnetic poles to generate voltages having different phases with respect to that of the voltage generated in the main generating winding.

It is a further object of this invention to provide a stator that reduces interference with the rotor as well as generation of vibration and noise, and has excellent mechanical strength.

DETAILED DESCRIPTION OF PREFERRED EMBODIMENTS

Figure 1:
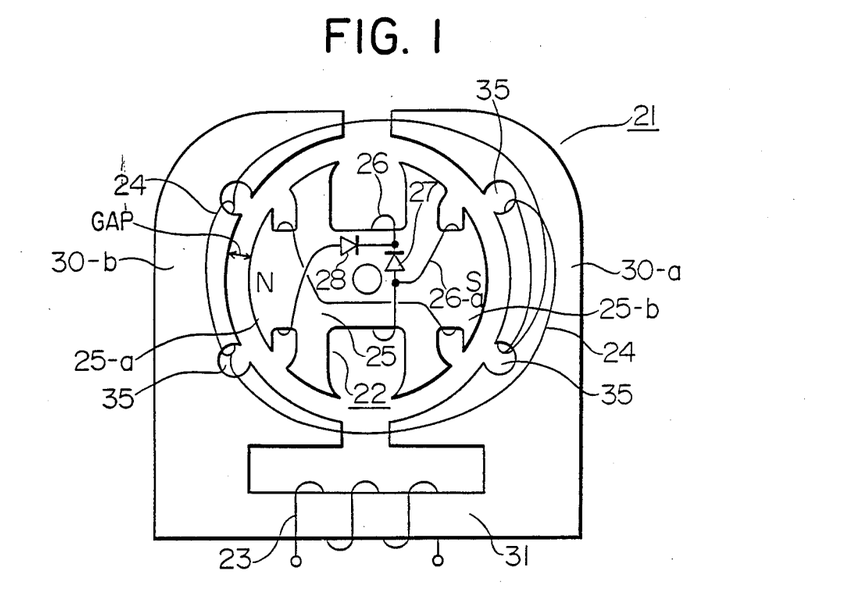
FIG. 1 is a diagram illustrating the construction of a rotating-field type self-excited brushless generator embodying this invention.

In FIG. 1, numeral 21 refers to a stator; 22 to a rotor; 23 to a 2-pole main generating winding; 24 to a 6-pole exciting winding; 25 to a rotor core (iron core); 25-a and 25-b to salient poles; 26 to a main field winding; 26-a to an auxiliary field winding; 27 and 28 to diodes; 30-a and 30b to stator magnetic poles; 31 to a yoke; and 35 to a slot, respectively.

In the stator 21, the exciting windings 24 are wound on the slots 35 are each provided on the stator magnetic poles 30-a and 30-b that are split into halves, and the main generating winding 23 is wound on the yoke 31 that connects the halved stator magnetic poles 30-a and 30-b. Since the exciting windings 24 are wound on the slots 35 provided on the stator magnetic poles 30-a and 30-b in this way, voltages having different phases from that of the voltage generated in the main generating winding 23 wound on the yoke 31 are generated in the exciting windings 24. The iron core of the stator 21 is constructed by laminating sheets of silicon steel containing 1-3.5% silicon, for example. The exciting winding 24 forms a return path without being connected to the field winding.

In the rotor 22, the main field winding 26 and the auxiliary field winding 26-a are wound on the rotor core 25 that rotates around the shaft. The rotor core 25 (that is, the rotor 22) has the salient poles 25-a and 25-b having the same number of poles as the number of poles of the main generating winding 23. The rotor core 25 is formed by laminating stamped steel sheets.

The stator 21 is disposed as separated by a predetermined gap from the rotor 22. That is, the stator magnetic poles 30-a and 30-b are disposed facing the rotor, separated by a predetermined gap. Thus, each of the halved stator magnetic poles 30-a and 30-b has a substantially semi-circular inner circumferential surface. The two stator magnetic poles 30-a and 30-b are connected to each other by the semi-rectangular yoke 31, forming the entire stator 21 into a substantially U-shape.

Figure 2:
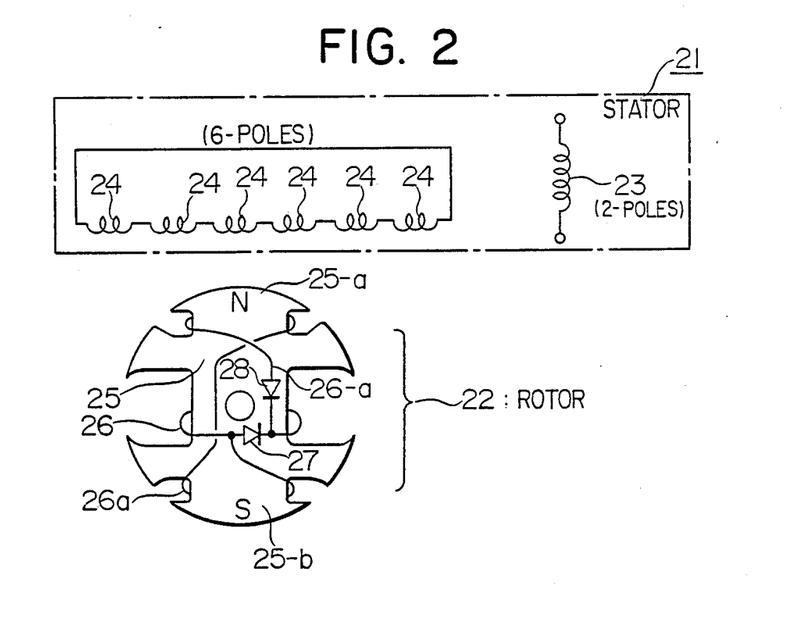
FIG. 2 is a schematic diagram illustrating an armature circuit and a field circuit used in the rotating-field type self-excited brushless generator shown in FIG. 1.
Figure 3:
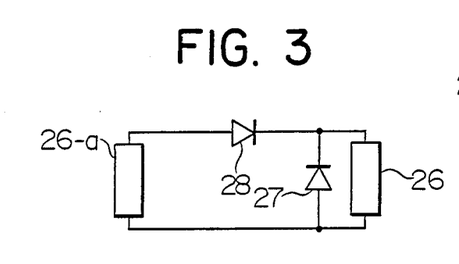
FIG. 3 is an equivalent circuit diagram of the rotor.

FIG. 2 is a schematic diagram illustrating an armature circuit and field circuit used in the generator shown in FIG. 1. FIG. 3 is an equivalent circuit diagram of the field circuit of the rotor 22. Reference numerals in these figures correspond to like numerals in FIG. 1.

That is, the 2-pole main generating winding 23 and the 6-pole exciting windings 24 are wound on the stator 21, with the 6-pole exciting windings 24 shown in the figure being directly shortcircuited to form a return path.

The rotor 22 used in the embodiment shown in the figure has salient poles 25-a and 25-b having the same number of poles (2 poles in the figure) as that of the main generating winding 23, and a diode 27 in series-connected to the main field winding 26 to produce the abovementioned 2-pole magnetic field. In addition, an auxiliary field winding 26-a is wound on the salient pole 25-a and, after crossed, also wound on the salient pole 25-b; with a diode 28 inserted in series in the auxiliary field winding 26-a. The auxiliary field winding 26-a is connected to the main field winding 26 in such a manner that the anode side of the diode 28 is connected to the cathode side of the diode 27. This arrangement helps the auxiliary field winding 26-a strengthen the magnetic pole N produced by the main field winding 26 on the surface of the salient pole 25-a, and also strengthen the magnetic pole S produced by the main field winding 26 on the surface of the salient pole 25-b.

That is, the auxiliary field winding 26-a is wound on the salient pole 25-a with a pitch smaller than twice the pitch of the 6-pole exciting winding 24, causing an electric current to flow through the diode 28 in such a direction as to add to the current flowing in the main field winding 26, producing in the salient pole 25-a a magnetic flux having the same polarity as that of the magnetic pole generated by the main field winding 26. Similarly, the auxiliary field winding 26-a is wound on the salient pole 25-b with a pitch smaller than twice the pitch of the single-phase, 6-pole exciting winding 24, causing a current to flow through the diode 28 in such a direction as to add to the current flowing in the main field winding 26 to produce in the salient pole 25-b a magnetic flux having the same polarity as the magnetic pole produced by the main field winding 26.

In the embodiment shown in FIG. 1, a current is caused to flow in the exciting windings 24 by the remnant magnetism of the rotor 22, and the magnetic flux (6-pole) produced by this current induces a voltage in the auxiliary field winding 26-a. The voltage thus induced feeds a current to the auxiliary field winding 26-a via the diode 28, and feeds a current to the main field winding 26 via the diode 28, forming a 2-pole main magnetic flux. This main magnetic flux in turn incudes a voltage in the main generating winding 23 wound in a 2-pole construction, causing a load current to flow.

A voltage is induced in the main field winding 26 by the armature reaction of this load current, acting so as to increase the voltage induced in the main generating winding 23, as in the case of the conventional type of generator. The 2-pole main flux, on the other hand, induces a voltage in the exciting windings 24 wound in a 6-pole construction, increasing the exciting current. The increase in the 6-pole flux caused by the increased exciting current increases the voltage induced in the auxiliary field winding 26-a, causing the magnetic flux to increase. With the repetition of the above operations, the output voltage of the main generating winding 23 is established.

When the magnetic flux generated by the abovementioned armature reaction intersects the main field winding 26, which is shortcircuited by the diode 27, a shortcircuited current increases, causing the 2-pole main magnetic flux to increase. This increases the voltage generated in the main generating winding 23, serving as a voltage compensation.

The magnetic flux produced by the main field winding 26 acts to increase the magnetic flux produced by the auxiliary field winding 26-a.

Even if the main generating winding 23 is wound in a 2-pole construction and the exciting winding 24 is in a 4-pole construction, a waveform having a slight distortion is produced, and the distortion can be reduced to a tolerable level, depending on specifications.

In the embodiment shown in FIG. 1, it is sufficient to connect the exciting windings 24 to form a return path, and there is no need for employing a separate excitation type, as shown in FIG. 15 above.

Figure 4A:
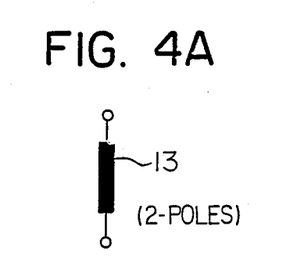
FIGS. 4(A) and (B) are diagrams illustrating variations of the main generating winding wound into a 2-pole construction.
Figure 4B:
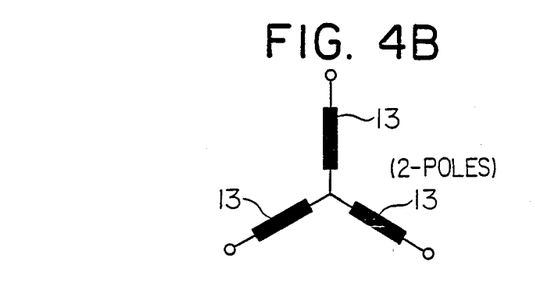
Figure 5A:
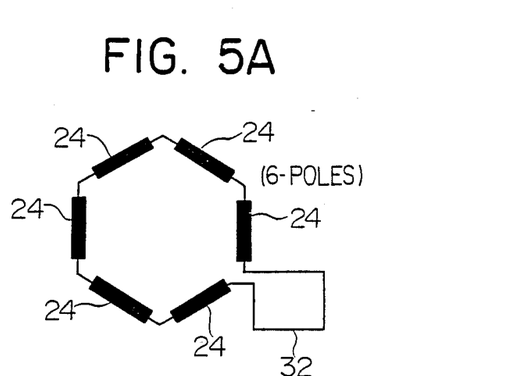
FIGS. 5(A), (B) and (C) are diagrams illustrating variations of the return path formed with the exciting winding wound into a 6-pole construction.

FIGS. 4(A) and (B) illustrate variations of the main generating winding wound in a 2-pole fashion, and FIGS. 5(A), (B) and (C) illustrate variations of the return path formed on the exciting winding wound in a 6-pole fashion. In the figure, numerals 23 and 24 corresponding to like numerals in FIG. 1. 32 refers to a directly shortcircuited return path, 33 to a diode forming a return path, and 34 to a capacitor forming a return path.

In this invention, a combination of at least any one type of the main generating winding 23 shown in FIGS. 4(A) and (B), and any one type of the return path formed on the exciting winding 24 shown in in FIGS. 5(A), (B) and (C) may be adopted.

Figure 5B:
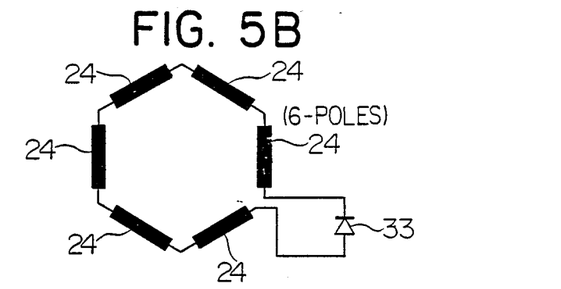
Figure 5C:
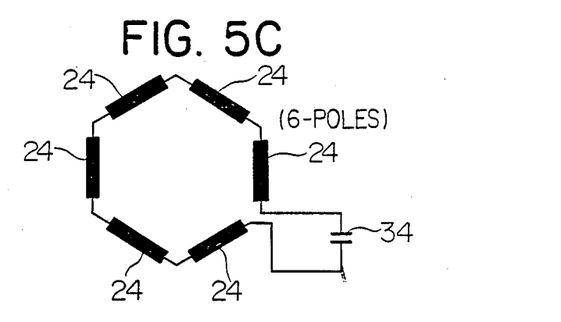

In the example shown in FIG. 5(B), a direct current flows in the exciting winding 24, causing a voltage to be induced in the main field winding 26 or the auxiliary field winding 26-a on the rotor 22. In the example shown in FIG. 5(C), an alternating current flowing in the exciting winding 24, causing a voltage to be induced in the main field winding 26 or the auxiliary field winding 26-a on the rotor. When the construction shown in FIG. 5(C) is adopted, the capacitance of the capacitor 34 can be set to a considerably lower value than that of a capacitor used in the construction where the number of poles of the exciting winding 24 is made equal to the number of poles of the main generating winding 23.

Figure 6:
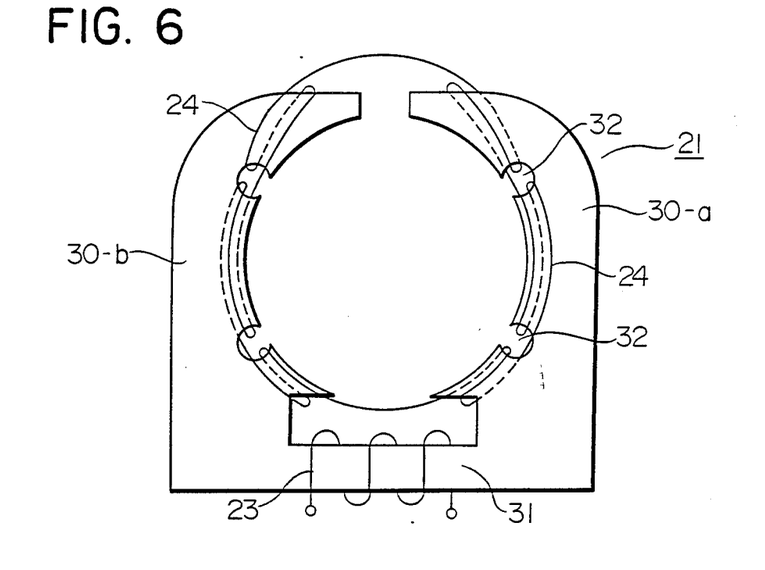
FIG. 6 is a diagram illustrating the construction of a stator in an embodiment representing a modification of this invention.

FIG. 6 shows an embodiment representing a variation of the embodiment shown in FIG. 1. Since FIG. 6 corresponds to FIG. 1, the construction of the rotor 22, which is the same as in FIG. 1, has been omitted.

In FIG. 6, the exciting winding 24 for producing 6-pole magnetic flux is wound on the slots 32 provided on the stator magnetic poles 30-1 and 30-b of the stator 21 with the same pitch as in the embodiment shown in FIG. 1 to form a 6-pole construction, as shown in the figure.

In the embodiment shown in FIG. 6, the return path of the exciting winding 24 is formed into any one type of FIGS. 5(A), (B) and (C).

Figure 7:
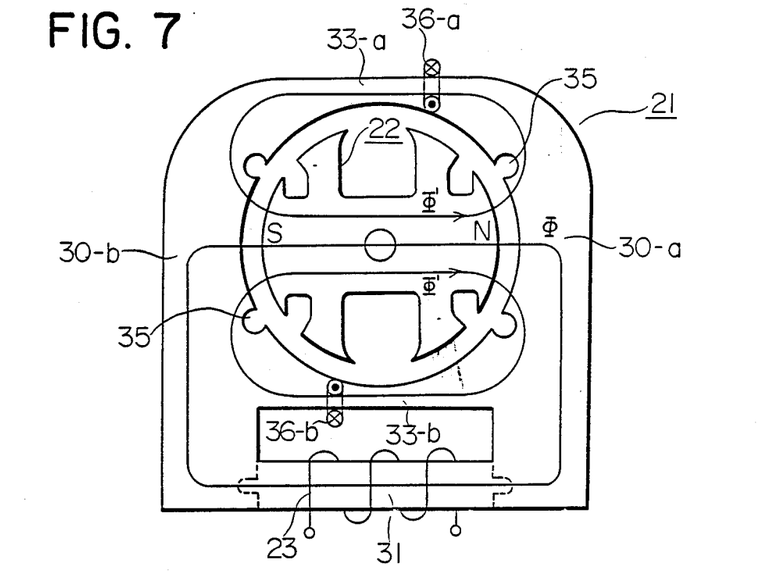
FIG. 7 is a diagram illustrating the construction of a stator having excellent mechanical strength used in this invention as well as the flow of magnetic flux in the stator.

FIG. 7 is a diagram illustrating the construction of a stator having excellent mechanical strength used in this invention, and the flow of magnetic flux thereof. Numerals 21 through 23, 30-a, 30-b, 31 and 35 correspond to like numerals in FIG. 1. The stator 21 is formed integrally with the stator magnetic poles 30-a and 30-b and the yoke 31, with the stator magnetic poles 30-a and 30-b, which are to have opposite polarities, connected into a shape shown in FIG. 7. The portions 33-a and 33-b continuously formed with the stator magnetic poles 30-a and 30-b have a small laminated cross-sectional area and a high magnetic resistance. A slot is provided on each of the portions 33-a and 33-b continuously formed with the stator magnetic poles 30-a and 30-b, and windings 36-a and 36-b are each wound on the slots. The windings 36-a and 36-b are tentatively termed as shading coils.

When a field current flows in a field winding (not shown) wound on the rotor 22, a magnetic circuit consisting of the rotor 22, the stator magnetic pole 30-a, the yoke 31, the stator magnetic pole 30-b and the rotor is formed, causing the magnetic flux $\Phi$ to flow in the magnetic circuit. In view of the fact that the stator magnetic poles 30-a and 30-b are not separated from each other, a magnetic circuit consisting of the rotor 22, the stator magnetic pole 30-a, the portion 33-a connecting the stator magnetic poles 30-a and 30-b, the stator magnetic pole 30-b and the rotor 22. and a magnetic circuit consisting of the rotor 22, the stator magnetic pole 30-a, the portion 33-b connecting the stator magnetic poles 30-a and 30-b, the stator magnetic pole 30-b and the rotor 22 are formed, causing a magnetic flux $\Phi'$ to flow in each of the magnetic circuits. Since the portions 33-a and 33-b continuously formed with the stator magnetic poles 30-a and 30-b have small laminated cross-sectional areas and a high magnetic resistance, as described above, the magnetic flux $\Phi'$ passing through these portions is low. Furthermore, the electromotive force based on the shortcircuit current in the shading coils 36-a and 36-b produced by the magnetic flux $\Phi'$ acts to cancel the magnetic flux $\Phi'$. As a result, the magnetic resistance between the stator magnetic poles 30-a and 30-b, that is, the magnetic resistance of the portions 33-a and 33-b continuously formed with the stator magnetic poles 30-a and 30-b is further increased to such an extent that the stator magnetic poles 30-a and 30-b can be regarded as magnetically substantially separated from each other.

In structural terms, mechanical strength is increased because the stator magnetic poles 30-a and 30-b are formed continuously. As a result, even if an attractive force based on the pulsating magnetic field caused by the frequency generated in the generator exerts on the stator 21, the portions 33-a and 33-b continuously formed with the stator magnetic poles 30-a and 30-b never deflect. Thus, interference with the rotor can be eliminated, and vibration and noise can be prevented.

In the foregoing, the shading coils 36-a and 36-b have been described as of a shortcircuited construction. Needless to say, however, the magnetic flux distribution in the stator 21 can be controlled by supplying a current for canceling the magnetic flux $\Phi'$ to the shading coils 36-a and 36-b from the outside.

In the stator 21 shown in FIG. 7, in which the stator magnetic poles 30-a and 30-b are integrally formed, part of the yoke 31 can be of a close-fit construction, as shown by dotted lines in the figure. By making part of the yoke 31 of a close-fit construction, assembly of motors can be made easy since the yoke 31 can be fitted to the stator 21 after the main generating winding 23 has been wound on the yoke 31.

Figure 8:
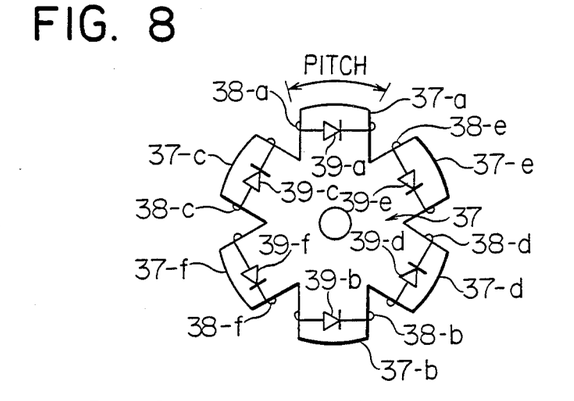
FIGS. 8, 9 and 10 are diagrams illustrating the constructions of still other examples of the rotor used in this invention.

FIG. 8 shows the construction of the rotor used in another embodiment of this invention. In the figure, numeral 37 refers to a field core; 37-a through 37-e to salient poles; 38-a through 38-e to field windings; 39-a, 39-c and 39-e to diodes to form magnetic poles of the same polarity on the salient poles 37-a, 37-c and 37-e. 39-b, 39-d and 39-f refers to diodes to form magnetic poles of the same polarity on the salient poles 37-b, 37-d and 37-f.

In the embodiment shown in FIG. 8, a voltage is induced in the field windings 38-a through 38-e by the magnetic flux generated in the exciting windings 24 connected in the manners shown in FIGS. 5(A), (B) and (C).

In the embodiment shown in FIG. 8, the N pole is produced on the salient poles 37-a, 37-c and 37-e, while the S pole is produced on the salient poles 37-b, 37-d and 37-f, and a voltage is induced in the main generating winding of the 2-pole construction by the 2-pole magnetic flux. In this case, too, the armature reaction by the load current induces a voltage in the field windings 38-a and 38-b, or 38-c and 38-d, or 38-e and 38-f, increasing the current flowing in the exciting windings 24.

Figure 9:
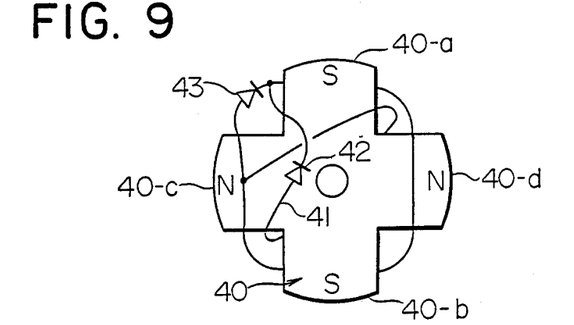
Figure 10:
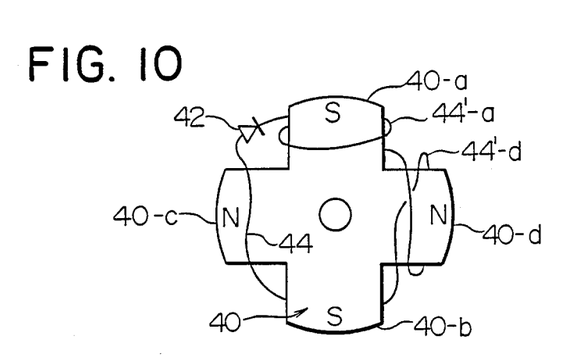

FIG. 9 shows an embodiment representing a variation of the embodiment shown in FIG. 1. FIG. 10 shows an embodiment representing a variation of the embodiment shown in FIG. 8.

In the embodiments shown in FIGS. 9 and 10, the main generating winding 23 is of a 2-pole construction and the exciting windings 24 are of a 4-pole construction. In the figure, numerals 40-a through 40-d refer to salient poles; 41 to a main field winding; 41-a to an auxiliary field winding; 42 and 43 to diodes; 44 to a field winding; 44'-a and 44'-d to unbalanced magnetic field generating portions, respectively.

In the embodiments shown in FIGS. 9 and 10, the winding 41 or 44 forms a 2-pole magnetic field, and a 4-pole magnetic field is introduced by the winding 41-a or the unbalanced magnetic field generating portions 44'-a and 44'-d.

Figure 11:
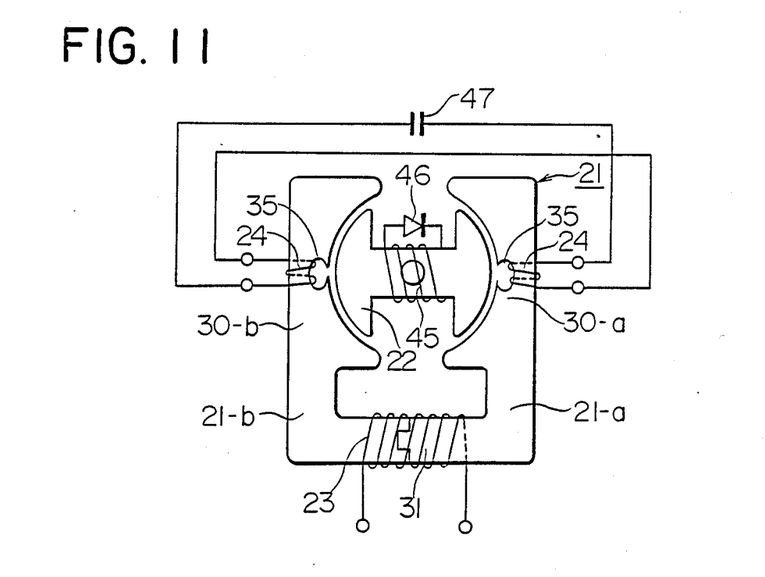
FIGS. 11, 12, 13 and 14 are diagrams illustrating the constructions of still other embodiments of the brushless generator according to this invention.

FIG. 11 is a diagram illustrating the construction of a brushless generator embodying this invention. Numerals 21 through 24, 30-a, 30-b, 31 and 35 correspond to like numerals in FIG. 1. 21-a and 21-b refer to stator cores; 45 to a field winding; 46 to a diode; and 47 to a capacitor, respectively.

The stator 21 comprises two symmetrical stator cores 21-a and 21-b, which are of a close-fit construction at the yoke 31, forming an integral U-shaped stator. Slots 35 are provided at the center of the stator magnetic poles 30-a and 30-b facing the rotor 22 on the stator cores 21-a and 21-b, and the exciting winding 24 is wound on each of the slots 35. Since these exciting windings 24 are wound at almost right angles with respect to the main generating winding 23, voltages having shifted phases are generated across the extending windings 24 and the main generating winding 23.

When the exciting windings 24 are connected in such a manner that the voltages generated in the exciting windings 24 are added, the added voltages, that is, the voltage of both the exciting windings 24 has a phase shifted 90° with respect to that of the voltage generated in the main generating winding 23. By connecting a capacitor 47 as shown in FIG. 11, the exciting windings 24 form a return path, causing a phase-advanced current to flow in the exciting windings 24 as in the case of FIG. 5(C). On the other hand, by connecting a rectifying diode 46 across the field winding 45, the generator shown in FIG. 11 becomes a brushless generator of a self-excited type. The voltage outputted to the terminals of the main generating winding 23 is determined by selecting the capacitance of the capacitor 47 to an appropriate value. Thus, by adopting the construction shown in FIG. 11, a brushless generator can be obtained, in which an almost constant output is produced in the main generating winding 23 without the use of a voltage regulator, regardless of changes in load.

Figure 12:
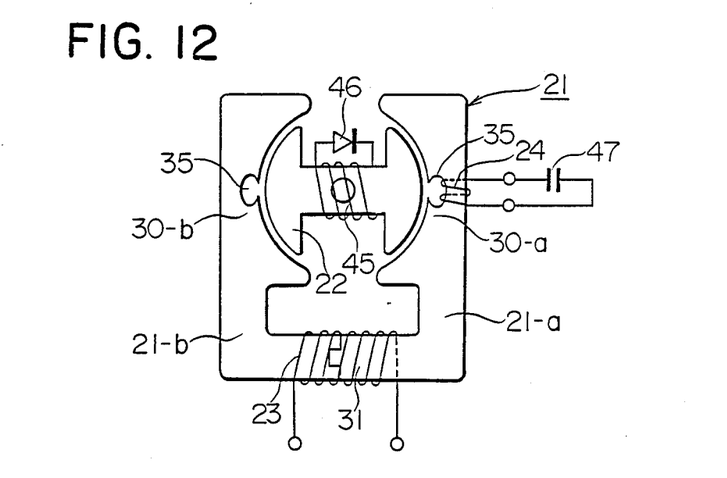

FIG. 12 shows still another embodiment of the brushless generator of this invention. Numerals 21 through 24, 30-a, 30-b, 31 and 35 correspond to like numerals in FIG. 1, and 21-a, 21-b, 45, 46 and 47 also correspond to like numerals in FIG. 11. The brushless generator shown in FIG. 12 has an exciting winding 24 wound on the slot 35 provided on the stator magnetic pole 30-a on one side, that is, on the side of the stator magnetic pole 30-a, for example, of the two stator magnetic poles 30-a and 30-b. By rotating the rotor 22 clockwise, a voltage having an advanced phase with respect to the voltage generated in the main generating winding 23 is generated in the exciting winding 24. A capacitor 47 is connected across the exciting winding 24. Since the rectifying diode 46 is connected across the field winding 45, the generator shown in FIG. 12 also becomes a brushless generator of a self-excited type, as in the case of the brushless generator shown in FIG. 11. The output voltage of the brushless generator shown in FIG. 12 can be made almost constant by selecting the capacitance of the capacitor 47 connected across both ends of the exciting winding 24 to an appropriate value. Similar effects can be achieved by winding an exciting winding on the slot 35 provided on the stator magnetic pole 30-b of the stator core 21-b and connecting a capacitor across the exciting winding.

Figure 13:
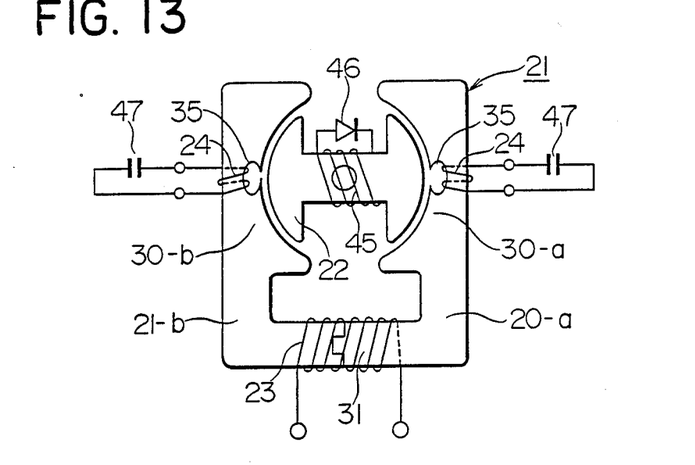

FIG. 13 shows still another embodiment of the brushless generator of this invention. The generator shown in the figure is a brushless generator shown in FIG. 11, in which another exciting winding 24 is wound on the slot 35 provided on the stator magnetic pole 30-b of the stator sore 21-b, and a capacitor is connected across both ends of the exciting winding 24. The operation of this generator is the same as that of the brushless generator of a self-excited type shown in FIG. 12.

Figure 14:
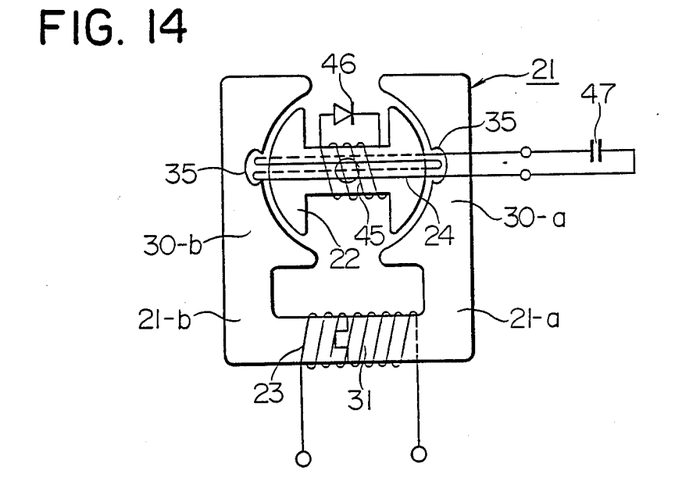

FIG. 14 shows still another embodiment of the brushless generator of this invention, in which power is generated as a voltage having a phase shifted 90° with respect to the main generating winding 23 is generated in the exciting winding 24, and a phase-advanced current is caused to flow in the capacitor 47.

As described above, this invention makes it possible to realize a brushless generator of a self-excited type by providing on stator magnetic poles slots for producing voltages having different phases with respect to the main generating winding, and exciting coils are wound on the slots. Even when the brushless generator is operated under a single-phase load, a load compensating function works to keep the output voltage almost constant. By using a stator in which magnetic poles are integrally connected and yet magnetically separated, the mechanical strength of the stator is increased, interference with the rotor is eliminated, and vibration and noise are reduced. Furthermore, part of the yoke can be made of a close-fit construction, the main generating winding can be easily wound.

What is claimed is:

1. A brushless generator comprising a rotor, and a stator having stator magnetic poles facing said rotor and a main generating winding; a magnetic field generated in said rotor intersecting said main generating winding to produce a voltage in said main generating winding, characterized in that said stator has exciting windings for generating magnetic fields by intersecting the magnetic field of said rotor; said exciting windings being constructed so that any one of the number of poles of said exciting windings and the number of poles of said main generating winding is an integral multiple of the other; said rotor has auxiliary field windings each wound with a pitch smaller than twice the pitch of said exciting windings, and a main field winding having the same number of poles as the number of poles of said main generating winding, and diodes are connected to said exciting windings so that both said auxiliary field windings and said main field winding generate magnetic flux of the same polarity; said exciting windings forming a return path so as to permit an exciting current to flow.

2. A brushless generator comprising
   a rotor having a main field winding wound on an iron core constituting said rotor and diodes rectifying a voltage induced in said main field winding,
   a stator having two stator magnetic poles opposing said rotor, a substantially U-shaped stator iron core having a yoke between said poles, and a ain generating winding wound on said yoke;
   a voltage being induced in said main generating winding as a magnetic field generated in said rotor intersects said main generating winding; and,
   slots provided at locations of said stator magnetic poles opposing said rotor, an exciting windings wound on said slots to generate a voltage having a different phase from the voltage generated in said main generating windings.

3. A brushless generator as claimed in claim 2, wherein said stator has a connecting portion mechanically connecting said two stator magnetic poles provided on said stator, a magnetic resistance enhancing means is provided on said connecting portion, and said stator is constructed so as to increase the mechanical strength thereof.

4. A brushless generator as claimed in claim 2, wherein two exciting windings are connected in series to a single capacitor and to each other.

5. A brushless generator as claimed in claim 2, wherein each of all said exciting windings is connected in series to a single capacitor.

6. A brushless generator as claimed in claim 2, wherein only one exciting winding is provided and said exciting winding is connected in series to a capacitor.

7. A brushless generator comprising:
a rotor having a main field winding wound on an iron core constituting said rotor, and diodes rectifying a voltage induced in said main field winding;
a stator having two stator magnetic poles opposing said rotor, a substantially U-shaped stator iron core having a yoke between said poles, and a main generating winding wound on said yoke;
a voltage being induced in said main generating winding as a magnetic field generated in said rotor intersects said main generating winding;
said stator having exciting windings generating magnetic fields by intersecting the magnetic field of said rotor;
said exciting windings being constructed so that any one of the number of poles of said exciting windings or the number of poles of said main generating winding is an integral multiple of the other, said exciting windings forming a return path so as to cause an exciting current to flow;
said rotor having auxiliary field windings each wound at a pitch less than twice the pitch of said exciting windings and a main field winding having the same number of poles as the number of poles of said main generating winding, said auxiliary field windings being connected to diodes so that magnetic fluxes of the same polarity are generated in both said auxiliary field windings and said main field winding.

8. A brushless generator as claimed in claim 7, wherein said main generating winding comprises a single-phase winding.

9. A brushless generator as claimed in claim 8, wherein said return path of said exciting windings comprises a short circuited circuit.

10. A brushless generator as claimed in claim 8, wherein said return path of said exciting windings comprises a diode.

11. A brushless generator as claimed in claim 8, wherein said return path of said exciting winding comprises a capacitor.

12. A brushless generator as claimed in claim 8, wherein said main generating winding comprises a 3-phase winding.

13. A brushless generator as claimed in claim 12, wherein said return path of said exciting winding comprises a short circuited circuit.

14. A brushless generator as claimed in claim 12, wherein said return path of said exciting windings comprises a diode.

15. A brushless generator as claimed in claim 12, wherein said return path of said exciting winding comprises a capacitor.

16. A brushless generator comprising:
a rotor having a main field winding wound on an iron core constituting said rotor, and diodes rectifying a voltage induced in said main field winding;
a stator having two stator magnetic poles opposing said rotor, a substantially U-shaped stator iron core having a yoke between said poles, and a main generating winding wound on said yoke;
a voltage being generated in said main generating winding as a magnetic field generated in said rotor intersects said main generating winding;
said stator having exciting windings generating magnetic fields by intersecting the magnetic field of said rotor;
said exciting windings being constructed so that any one of the number of poles of said exciting windings or the number of poles of said main generating winding is an integral multiple of the other, and said exciting windings forming a return path so as to cause an exciting current to flow; and
said rotor having field windings wound on pole pieces of the same number as the number of poles of said main generating winding, said field winding being connected to diodes so that magnetic fluxes generated in said field windings generate field magnetic poles of the same number as the number of poles of said main generating winding.

17. A brushless generator as claimed in claim 16, wherein two exciting windings are connected in series to a single capacitor and to each other.

18. A brushless generator as claimed in claim 16, wherein each of all said exciting windings is connected in series to a single capacitor.

19. A brushless generator as claimed in claim 16, wherein only one exciting winding is provided and said exciting winding is connected in series to a capacitor.

20. A brushless generator as claimed in claim 16, wherein each of said field windings is wound on each of said field magnetic poles and diodes are connected across both ends of said field windings.

* * * * *